(12) United States Patent
Hwang

(10) Patent No.: US 6,878,084 B2
(45) Date of Patent: Apr. 12, 2005

(54) POWER TRANSMISSION APPARATUS FOR BICYCLE

(75) Inventor: Chil-Sung Hwang, Cheonan-si (KR)

(73) Assignee: Bikevalley Co., Ltd., Taejon (KR)

( * ) Notice: Subject to any disclaimer, the term of this patent is extended or adjusted under 35 U.S.C. 154(b) by 0 days.

(21) Appl. No.: 10/435,391

(22) Filed: May 12, 2003

(65) Prior Publication Data

US 2004/0209726 A1 Oct. 21, 2004

(30) Foreign Application Priority Data

Apr. 21, 2003 (KR) ................................. 10-2003-0025164

(51) Int. Cl.$^7$ .................. F16H 37/02; B62K 61/02; B62D 11/00; B62M 13/00
(52) U.S. Cl. .................. 475/214; 475/209; 180/221; 280/260
(58) Field of Search ............................. 475/214, 217, 475/219, 209; 180/218–219, 210, 221, 226, 220; 280/259–260

(56) References Cited

U.S. PATENT DOCUMENTS

| | | | | |
|---|---|---|---|---|
| 2,070,224 A | * | 2/1937 | Cortesi | 74/362 |
| 4,249,750 A | * | 2/1981 | Kantner | 280/216 |
| 4,706,982 A | * | 11/1987 | Hartmann | 280/238 |
| 5,078,416 A | * | 1/1992 | Keyes | 280/260 |
| 5,316,327 A | * | 5/1994 | Bell | 280/260 |
| 5,370,200 A | * | 12/1994 | Takata | 180/206 |
| 5,375,676 A | * | 12/1994 | Takata et al. | 180/206 |
| 5,482,306 A | * | 1/1996 | Hsu | 280/260 |
| 5,622,081 A | * | 4/1997 | Clements | 74/351 |
| 5,662,009 A | * | 9/1997 | Palmer | 74/810.1 |
| 5,967,938 A | * | 10/1999 | Benford et al. | 475/297 |
| 6,248,036 B1 | * | 6/2001 | Masaki | 475/2 |
| 6,468,178 B1 | * | 10/2002 | Mohtasham | 475/277 |
| 6,478,323 B2 | * | 11/2002 | Chang | 280/260 |
| 6,554,730 B1 | * | 4/2003 | Sakai et al. | 475/195 |
| 6,685,205 B1 | * | 2/2004 | Weaver et al. | 280/260 |

FOREIGN PATENT DOCUMENTS

| | | | | |
|---|---|---|---|---|
| JP | 07205874 A | * | 8/1995 | B62M/11/18 |

* cited by examiner

*Primary Examiner*—Tisha Lewis
(74) *Attorney, Agent, or Firm*—Birch, Stewart, Kolasch & Birch, LLP

(57) ABSTRACT

A power transmission apparatus for a bicycle is provided comprising:
 a transmission driving part for transmitting a rotating force generated by a pedaling force applied to a sun gear shaft of a pedal part in the bicycle to a rear wheel through a crown sprocket gear, the transmission driving part comprising a planet gear part operated by a gear shift; and
 a transmission driven shaft part connected to a driven shaft to transmit a transmission rotational force through a rear roller gear part, the transmission rotational force being increased by changing an auxiliary transmission part to a hub crown sprocket gear of a hub shaft of a rear wheel through a front roller gear part.

3 Claims, 4 Drawing Sheets

POWER TRANSMISSION APPARATUS FOR BICYCLE

TECHNICAL FIELD

This invention relates to a power transmission apparatus for bicycle, and more particularly to the power transmission apparatus for removing a chain transmitting the power in the bicycle, and driving the bicycle with little pedaling force by comprising a transmission driving part and a transmission driven shaft part.

PRIOR ART

Generally, a bicycle comprises front and rear wheels installed rotatably at front and rear positions of a frame, respectively, pedals generating a power by foot of a rider, and a power transmission member for transmitting the power generated from a rotation of the pedals to the rear wheel.

Here, the power transmission member is provided with a driving sprocket near the pedal, a driven sprocket having a latch means to transmit the power in only one direction, and a chain connecting the driving sprocket and the driven sprocket.

The driven sprocket is provided with latch mechanism for engaging in only on direction with the rear wheel.

According to a conventional bicycle having a technical constitution as described above, when the pedal is rotated in one direction, that is, forwarding direction, the rotation force is transmitted to the rear wheel by the chain connecting the driving sprocket and the driven sprocket, and thus, the bicycle is driven in only forwarding direction.

Therefore, since a rider must rotate the pedal in only one forwarding direction, the muscle of a leg may be developed with a imbalance upon driving for a long time.

Further, since the same exercise is repeated, it is not only easily bored, but the fatigue is accumulated easily, and it is impossible to relieve the fatigue of the muscle upon driving.

Here, according to the prior driving device, in case of stopping the rotation of the pedal, or rotating the pedal contrariwise, the driving sprocket and chain is rotated contrariwise, but the result that the driven sprocket is run idle contrariwise is produced with the power transmission cut off by one direction latch means.

Further, the speed change device for improving the power transmission of the bicycle is disclosed. This device has been sometimes mounted to a wheel chair, and a toy car, etc. using a pedal.

Recently, not only the common speed change device changing the speed by altering the location of a chain transmitting the power among the gears having various diameters mounted to the shafts of a front and rear wheels, but also a speed change device installed within a hub of a rear wheel of bicycle, etc., and changing speed in the ratio of number of tooth for a gear by arranging the small gears into the hub has been developed and used.

However, the foresaid prior speed change devices have demerits in that their constitution elements are complicated, and thus a total weight and volume is increased. Thus, the devices may have a problem in view of whole durability.

Further, since most of the prior bicycles adopt a way of transmitting a power to a rear wheel by a chain, there has been a problem that a trousers or a skirt for a rider is damaged upon driving.

Further, since an accident that a chain is taken off from the antiquated bicycle is occurred, there have been problems that a rider has to hang the chain on the sprocket manually, and thus a time is wasted and the hands and clothes of the rider are spoiled.

DISCLOSURE OF THE INVENTION

Therefore, the invention has been made in view of the above problems, and it is an object of the invention to provide a power transmission apparatus for removing a chain transmitting the power in a bicycle, and driving the bicycle with little pedaling force by comprising a transmission driving part and a transmission driven shaft part.

In order to accomplish the above object of the invention, a power transmission apparatus for a bicycle according to the invention comprises a transmission driving part for transmitting a rotating force generated by a pedaling force applied to a sun gear shaft of a pedal part in the bicycle to a rear wheel through a crown sprocket gear, as shifting a main transmission part consisted of a planet gear part upon operating with a gear shift, and a transmission driven shaft part connected to a driven shaft to transmit a transmission rotating force through a rear roller gear part, the transmission rotating force being increased by changing secondly an auxiliary transmission part to a hub crown sprocket gear of a hub shaft of a rear wheel through a front roller gear part.

According to the invention, if the sun gear of the pedal shaft generates the rotation force by pedaling the pedal of the transmission for the bicycle, the speed is changed by a difference between the numbers of tooth of the planet gear in the main transmission part, and then the rotation force is transmitted to the transmission driven shaft part through the crown sprocket gear and the front roller gear part.

If the rotation force is transmitted to the transmission driven shaft part, after changing the speed selectively in the auxiliary transmission part on the driven shaft, the rotation force is transmitted through the rear roller gear part to the hub crown sprocket gear of the hub shaft for the rear wheel. Thus, a rider can ride the bicycle without using a great force.

BEST MODES FOR CARRYING OUT THE INVENTION

The above and other objects, features and other advantages of the invention will be more clearly understood from the following detailed description taken in conjunction with the accompanying drawings.

Figure 1:
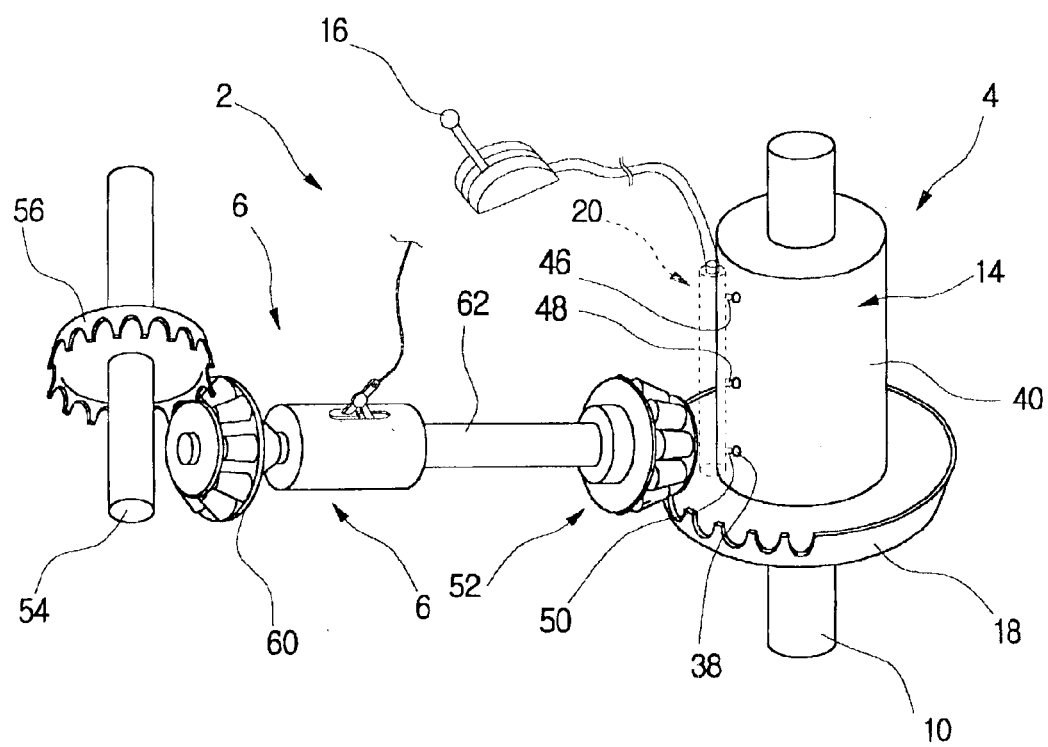
FIG. 1 is a perspective view of a power transmission apparatus for bicycle according to the invention.
Figure 2:
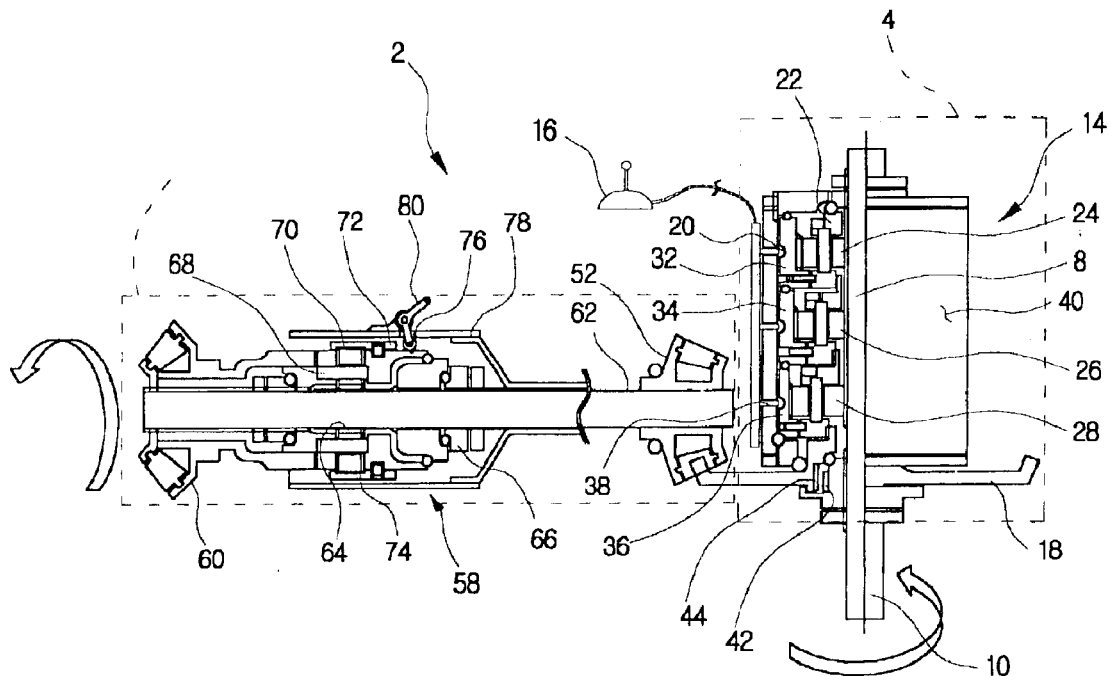
FIG. 2 is a sectional side elevation of a transmission driving part and a transmission driven shaft part of a power transmission apparatus for bicycle according to the invention.

FIG. 1 is a perspective view of a power transmission apparatus for bicycle according to the invention, and FIG. 2 is a sectional side elevation of a transmission driving part and a transmission driven shaft part of a power transmission apparatus according to the invention.

Figure 3:
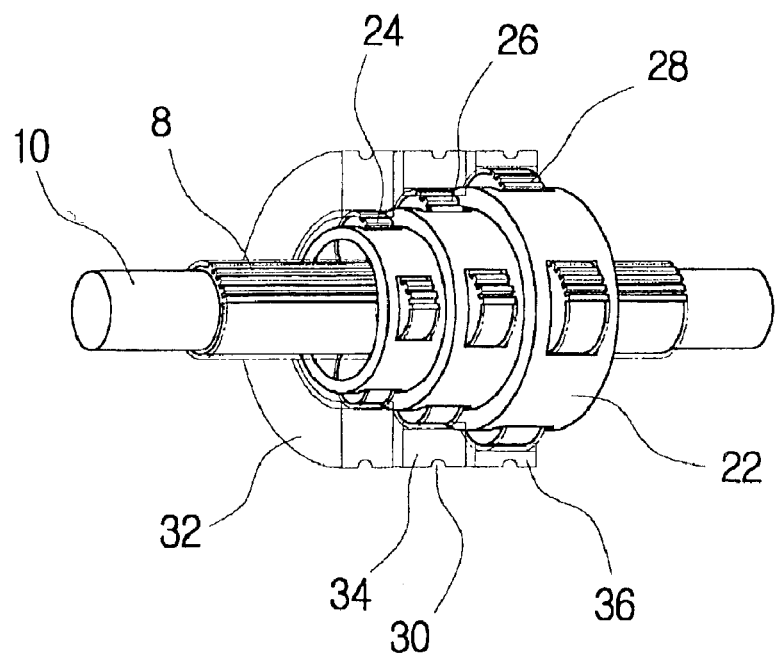
FIG. 3 is a view of a planet gear part according the invention.
Figure 6:
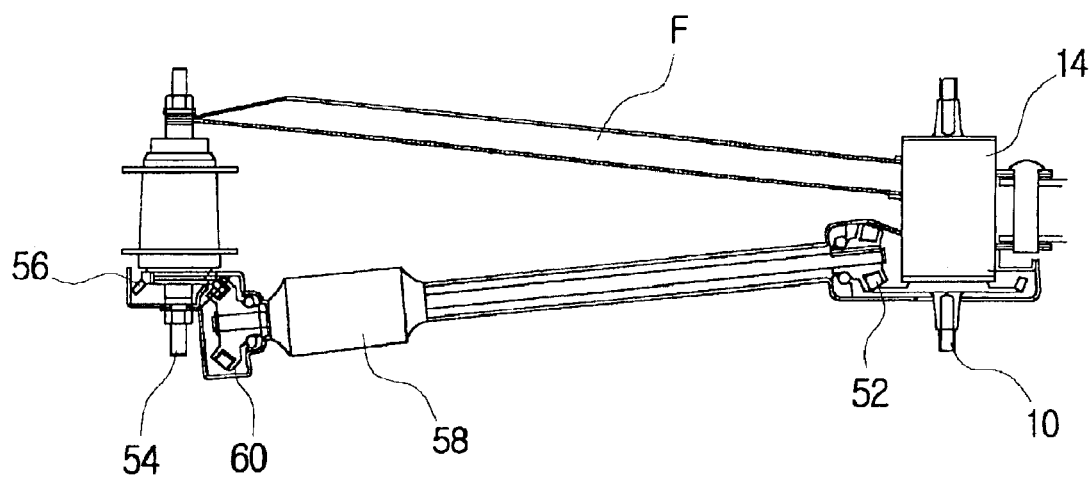
FIG. 6 is a view showing an embodiment for applying a power transmission apparatus for bicycle according to the invention to a bicycle frame.

Further, FIG. 3 is a view of a planet gear part according the invention, and FIG. 6 a view showing an embodiment for applying a power transmission apparatus to a bicycle frame.

A power transmission apparatus (2) for a bicycle comprises a transmission driving part (4) and a transmission driven shaft part (6).

The transmission driving part (4) transmits a rotating force generated by a pedaling force applied to a pedal shaft (10) having a sun gear (8) in the bicycle to a rear wheel through a crown sprocket gear (18), as shifting a main transmission part (14) consisted of a planet gear part (12) upon operating with a gear shift (16).

The transmission driving part (4) is provided with the main transmission part (14), the crown sprocket gear (18), and a transmission pin part (20).

The main transmission part (14) includes a pedal shaft (10) having a sun gear (8) installed rotatably by pedaling of a pedal not shown, a first, second, and third group of planet gear (24, 26, 28) disposed on an integral multi-step carrier (22) to engage the circumference surface of the sun gear (8) of the pedal shaft (10), and installed in a plurality of rolls to the axial direction, a planet gear part (12) having a first, second, and third ring gear (32, 34, 36) separately assembled with different thickness on outer circumference of the multi-step carrier (22) to engage with the first, second, and third planet gear (24, 26, 28) at its internal circumference, and having pin grooves (30) on its outer circumference, and a housing (40) having the planet gear part (12) built-in and provided with pin holes (38), and fixing to the first, second, and third ring gear (32, 34, 36) by aligning the pin holes (38) over the pin grooves (30) of the first, second, and third ring gear (32, 34, 36).

The crown sprocket gear (18) is splined on one side of the inner circumference of the multi-step carrier (22) of the planet gear part (12) in the main transmission part (14). Further, The crown sprocket gear (18) is rotated in one direction by engaging with a latch (42) installed in one side of the pedal shaft (10) and a latch gear (44) formed on the inner circumference at a low speed.

The transmission pin part (20) has commonly a first, second, and third transmission pin (46, 48, 50) linked at its one side by operation of the gear shift (16) to move forward or backward to the pin hole (38) of the housing (40).

The transmission driven shaft part (6) is connected to a driven shaft (62) to transmit a transmission rotating force through a rear roller gear part (60). The transmission rotating force is increased by changing secondly an auxiliary transmission part (58) from the transmission driving part (4) through a front roller gear (52) to a hub crown sprocket gear (56) of a hub shaft (54) of the rear wheel.

The transmission driven shaft part (6) is provided with the front roller gear (52), the driven shaft (62), an auxiliary transmission part (58), and the rear roller gear (60).

The front roller gear (52) is installed at a predetermined angle to rotate engaging with the crown sprocket gear (18) of the transmission driving part (4).

The driven shaft (62) is formed in a predetermined length and assembled to the front roller gear (52). Further, an auxiliary sun gear (64) is formed in a part of the outer circumference of the driven shaft (62).

The auxiliary transmission part (58) includes an auxiliary planet gear (70) disposed rotatably by an auxiliary carrier (68) supported at both side by a bearing stopper (66) to engage at a predetermined space with the auxiliary sun gear (64) formed in a part of the outer circumference of the driven shaft (62), an auxiliary ring gear (74) assembled rotatably by engaging with the auxiliary planet gear (70) on the outer circumference of the auxiliary carrier (68) and having a engaging jaw (72) projected at one sided edge, and an auxiliary transmission bar (80) rotated to couple the engaging jaw (72) by the operation of the gear shift (16) on the outer circumference of an auxiliary housing (78) assembled to the driven shaft (62) to have the auxiliary ring gear (74) of the auxiliary transmission part (58) built in and having an auxiliary transmission hole (76).

The rear roller gear (60) is splined to one side of the auxiliary carrier (68) of the auxiliary transmission part (58) to engage with a hub crown sprocket gear (56) of a hub shaft (54) of the rear wheel.

The foregoing power transmission apparatus (2) is mounted to the frame (F). The shape or form of the frame (F) is not limited, and is modified variously.

Further, since he power transmission apparatus (2) is built in a housing or a cover, it looks smart externally, and is modified variously according the design specification.

The operational effect of the invention will be given herein below.

If a rider pushes pedal not shown without a transmission, the latch (42) mounted at one side of the pedal shaft (10) to rotate in only one direction is caught on the latch gear (44) of the crown sprocket gear (18), and then the pedaling force is transmitted to the front roller gear (52) of the transmission driven shaft part (6) at a first speed to drive the bicycle.

And then if a rider manipulates the gear shift (16) so that the first transmission pin (48) of the transmission pin part (20) is pressed and coupled to the pin groove (30) of the first ring gear (32) through the pin hole (38) of the housing (40), the first ring gear (32) is stopped, and thus the rotation force passing the pedal shaft (10) is transmitted through the sun gear (8) to the first group of planet gear (24) to rotate the first planet gear (24).

The rotation force generated by the first group of planet gear (24) is increased more than the rotation force of the sun gear (8). The increased rotation force is transmitted to the multi-step carrier (22) to rotate the multi-step carrier (22).

Thus, the rotation force transmitted to the multi-step carrier (22) is transmitted to the crown sprocket gear (18) having a spline gear at its one side to rotate the crown sprocket gear (18). Here, since the latch (42) installed to the pedal shaft (10) is rotated more slowly than the latch gear (44), they are not engaged mutually, and rotated without an interference.

Meanwhile, the rotation force of the first group of planet gear (24) is transmitted through the crown sprocket gear (18) to the front roller gear (52) of the transmission shaft part (6) to rotate the driven shaft (62).

Thus, if the rider manipulates the gear shift (16) and, actuates selectively the auxiliary transmission bar (80), the foregoing increased rotation force is obtained. If the auxiliary transmission bar (80) is actuated, it is coupled to the engaging jaw (72) of the auxiliary ring gear (74) to fix the auxiliary ring gear (74).

And then, if the auxiliary planet gear (70) is rotated on axis of the auxiliary sun gear (64), the auxiliary carrier (68) also is rotated. As a result, a first increased rotation force from the first group of planet gear (24) and a second increased rotation force from the auxiliary planet gear (70)

are transmitted to the rear roller gear (60) by way of the spline gear type coupling.

From the foregoing, the rotation force increased during a first and second step is transmitted through the rear roller gear (60) to the hub crown sprocket gear (56) of the hub shaft (54) of the rear wheel. Thus, since the bicycle is driven by the increased rotation force, satisfactory speed and safe driving are realized without a great pedaling force.

Figure 4:
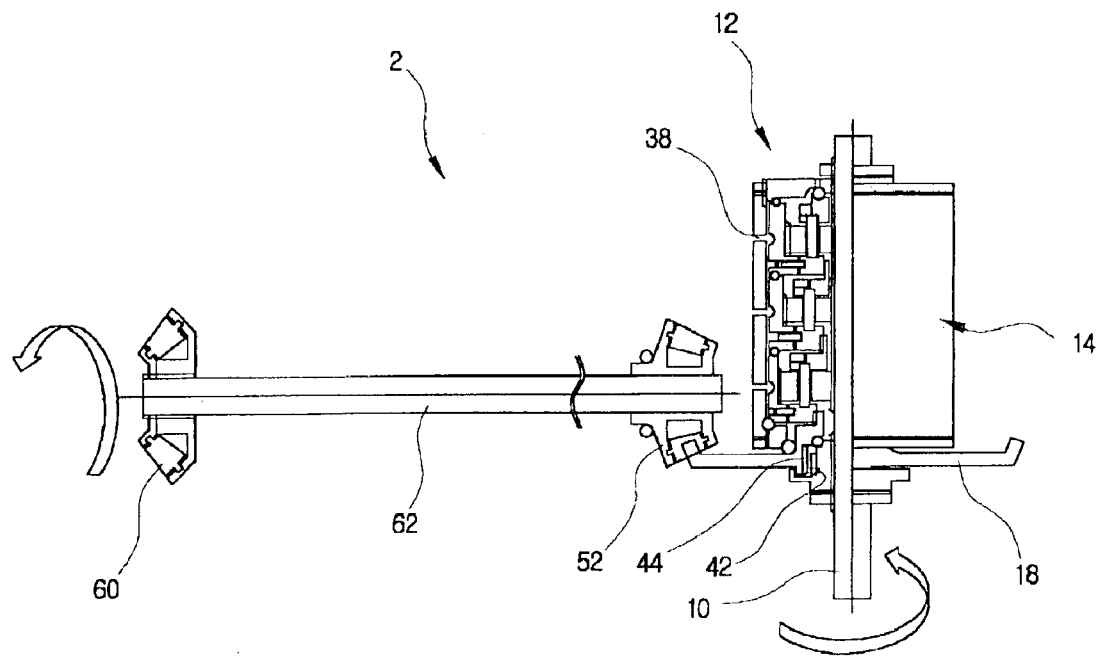
FIG. 4 is a view of another embodiment of a transmission driven shaft part according to the invention.

FIG. 4 is a view of another embodiment of a transmission driven shaft part according to the invention. Referring to FIG. 4, the auxiliary transmission part (58) is removed on the driven shaft (62), and only front and rear roller gears (52, 60) are mounted on both end of the driven shaft (62), respectively.

Figure 5:
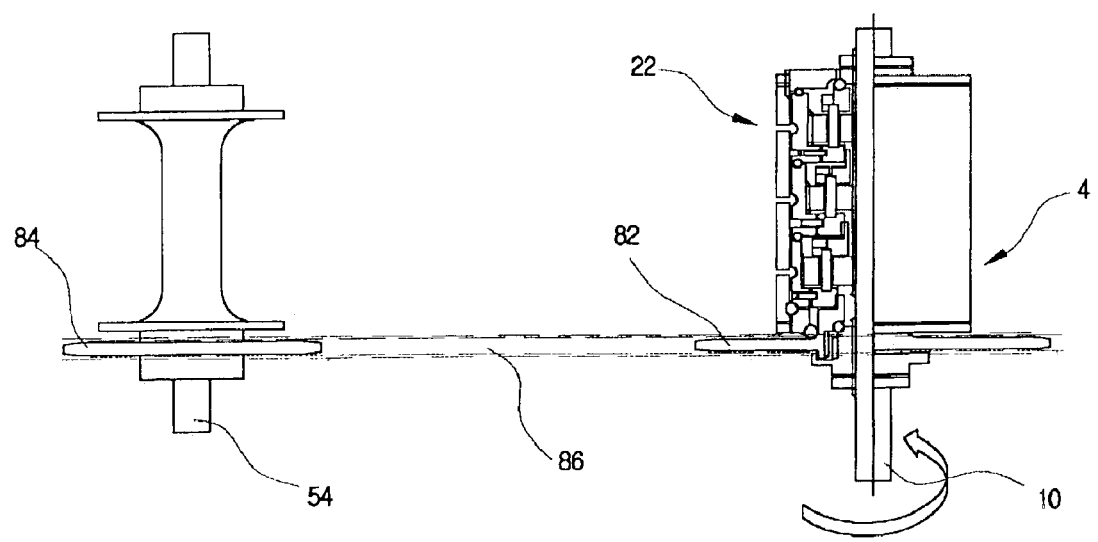
FIG. 5 is an view showing a transmission driving part adopting a chain.

Further, FIG. 5 is an view showing a transmission driving part adopting a chain. Referring to FIG. 5, if a chain sprocket gear (82) is adopted by improving the crown sprocket gear (18) of the transmission driving part (4), and a chain sprocket gear (84) is also adopted to the hub shaft (54) for the rear wheel, the rotation force may be transmitted via the chain (86) to the rear wheel of the bicycle.

From the foregoing, since a driving operation of the bicycle according to the case for applying only front and rear roller gears (52, 60) to the driven shaft (62) and the case for transmitting the rotation force via the chain (86) by adopting the chain sprocket gears (82, 84) is same, further detailed description is omitted herein below.

INDUSTRIAL APPLICABILITY

The invention has effects in that the operation for changing a speed is facilitated according to the intention of a rider, a satisfactory speed is provided since an extension range of a speed ratio according to a transmission is large, and a safe driving is provided due to a precise transmission.

Further, the bicycle can be used pleasantly by adopting a planet gear to decrease a noise, and a driving efficiency in enhanced by little pedaling force of the rider. Thus, technology according to the invention is useful to a leisure industry or a bicycle manufacturing industry.

What is claimed is:

1. A power transmission apparatus for a bicycle comprising:
   a transmission driving part for transmitting a rotating force generated by a pedaling force applied to a sun gear shaft of a pedal part in the bicycle to a rear wheel through a crown sprocket gear, said transmission driving part comprising a planet gear part operated by a gear shift; and
   a transmission driven shaft part connected to a driven shaft to transmit a transmission rotational force through a rear roller gear part, the transmission rotational force being increased by changing an auxiliary transmission part to a hub crown sprocket gear of a hub shaft of a rear wheel through a front roller gear part.

2. The power transmission apparatus for the bicycle according to claim 1, wherein the transmission driving part comprises
   a main transmission part including a pedal shaft having a sun gear installed rotatably by pedaling of a pedal, a first, second, and third group of planet gears disposed on an integral multi-step carrier engageable with the circumference surface of the sun gear of the pedal shaft, and installed in a plurality of rolls to the axial direction, a planet gear part having a first, second, and third ring gear superlatively assembled with different thickness on outer circumference of the multi-step carrier to engage with the first, second, and third group of planet gears at its internal circumference, and having pin grooves on its outer circumference, and a housing for the planet gear part and provided with pin holes, and fixing to the first, second, and third ring gear by aligning the pin holes over the pin grooves of the first, second, and third ring gear;
   a crown sprocket gear splined on one side of the inner circumference of the multi-step carrier of the planet gear part in the main transmission part, and rotating in one direction by a latch and a latch gear of the pedal shaft; and
   a transmission pin part having a first, second, and third transmission pin linked at its one side by operation of the gear shift to move forward or backward to the pin hole of the housing.

3. The power transmission apparatus for the bicycle according to claim 1, wherein the transmission driven shaft part comprises
   an auxiliary transmission part including a front roller gear installed at a predetermined angle to engagedly rotate with the crown sprocket gear of the transmission driving part, a driven shaft formed in a predetermined length and assembled to the front roller gear, an auxiliary planet gear disposed rotatably by an auxiliary carrier supported at both sides by a bearing stopper to engage at a predetermined space with an auxiliary sun gear formed in a part of the outer circumference of the driven shaft, an auxiliary ring gear assembled rotatably by engaging with the auxiliary planet gear on the outer circumference of the auxiliary carrier and having a engaging jaw projected at one sided edge, and an auxiliary transmission bar rotated to couple the engaging jaw by the operation of the gear shift on the outer circumference of an auxiliary housing assembled to the driven shaft to have the auxiliary ring gear of the auxiliary transmission part built in and having an auxiliary transmission hole; and
   a rear roller gear splined to one side of the auxiliary carrier of the auxiliary transmission part to engage with a hub crown sprocket gear of a hub shaft.

* * * * *